J. R. FINLEY.
Harvester Rake.
No. 92,713.
Patented July 20, 1869.
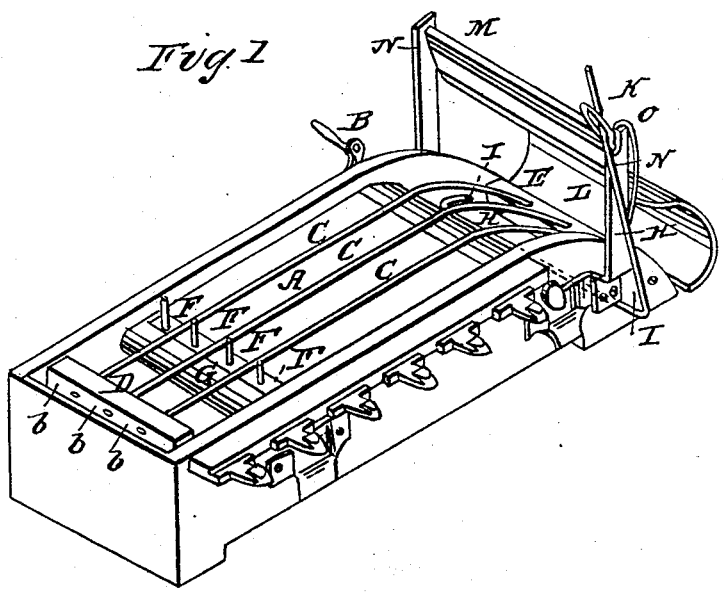
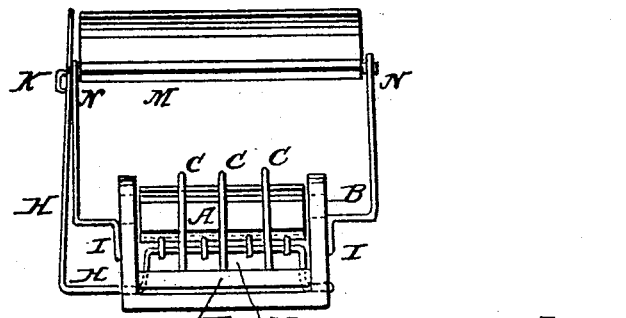

UNITED STATES PATENT OFFICE.

J. R. FINLEY, OF DELPHI, INDIANA.

IMPROVEMENT IN HARVESTER-RAKES.

Specification forming part of Letters Patent No. 92,713, dated July 20, 1869.

*To all whom it may concern:*

Be it known that I, J. R. FINLEY, of Delphi, in the county of Carroll, in the State of Indiana, have invented a new and useful Improvement in Wheat-Dropper; and that the following, taken in connection with the accompanying plate of drawings, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that description of appurtenances to harvesting-machines termed "grain-droppers;" and consists in an endless band or flexible apron, provided with a series of vertical posts, which catches the grain which is severed by the cutting apparatus, and discharges it into an automatic gaveling attachment, where it is held until a sufficient quantity has accumulated to form a gavel, and then discharges upon the ground by means of an automatic mechanism.

In the accompanying plate of drawings, which illustrate my invention and form a part of the specification thereof, Figure 1 is a perspective view, showing the component parts of my invention—to wit, the endless band A revolving upon cylindrical rollers and actuated by the crank B; the metallic cylindrical bars c, upon which the grain falls after being severed by the cutting apparatus; the axis-bar D, provided with the slots d, in which the ends of the said cylindrical bars are inserted; the movable cross-piece E, securing the ends of the said cylindrical bars c, and rising and falling with the same when revolving about the axis-bar D as a center; the upright studs F, attached to the metallic bar G, which said bar is secured firmly to the endless band A; the bell-crank or elbow-lever H, having its bearings at I and working in the slotted yoke K; the gaveling attachment L, suspended upon the axis-bar M, which has its bearings in the standards; and, lastly, the spring attachment o, which allows the said gaveling attachment to be removed at pleasure.

Fig. 2 is an end elevation of my invention, in which sundry parts of my invention are more distinctly portrayed, and which shows the relative position of said parts when the gaveling attachment is raised.

Having thus generally indicated to what my invention relates, in what it consists, and the component parts thereof, I will proceed to describe its operation and designate what I claim as new and desire to secure by Letters Patent.

The grain, after having been severed from the cutting apparatus, falls upon the bars c, and is immediately caught by the upright studs F, which rotate upon the endless band c, transported along the said bars and ultimately deposited in the gaveling attachment L. The said studs, having thus filled the said gaveling attachment, actuate the crank H, thereby imparting alternating circular motion to the axis upon which the said gaveling attachment is suspended, thus causing the same to rise, as represented in Fig. 2, and allow a gavel to fall upon the ground. After the said studs have passed the crank-bar H the said gaveling attachment falls, and resumes its normal position by the force of gravity.

Two or more series of studs, F, are attached to the endless band A, so that when one set is actuating the bell-crank H, as represented in Fig. 2, another set, as seen in Fig. 1, is performing the office of transportation, as hereinbefore described.

I shall designate my claim, for the sake of perspicuity and convenience, into the two following clauses, as follows, to wit:

1. I claim the rotating band A with the upright studs F, in combination with the bell-crank H, substantially as described.

2. I claim the bell-crank or elbow-lever H, in combination with the gaveling attachment L, with its slotted crank K and axis-bar M.

J. R. FINLEY.

Witnesses:
JOHN FARNEMAN,
MICHAEL CLIFFORD.